No. 762,773. PATENTED JUNE 14, 1904.
L. TRABUE.
DIVISION BLOCK SETTER FOR BALING PRESSES.
APPLICATION FILED OCT. 29, 1903.
NO MODEL. 2 SHEETS—SHEET 1.
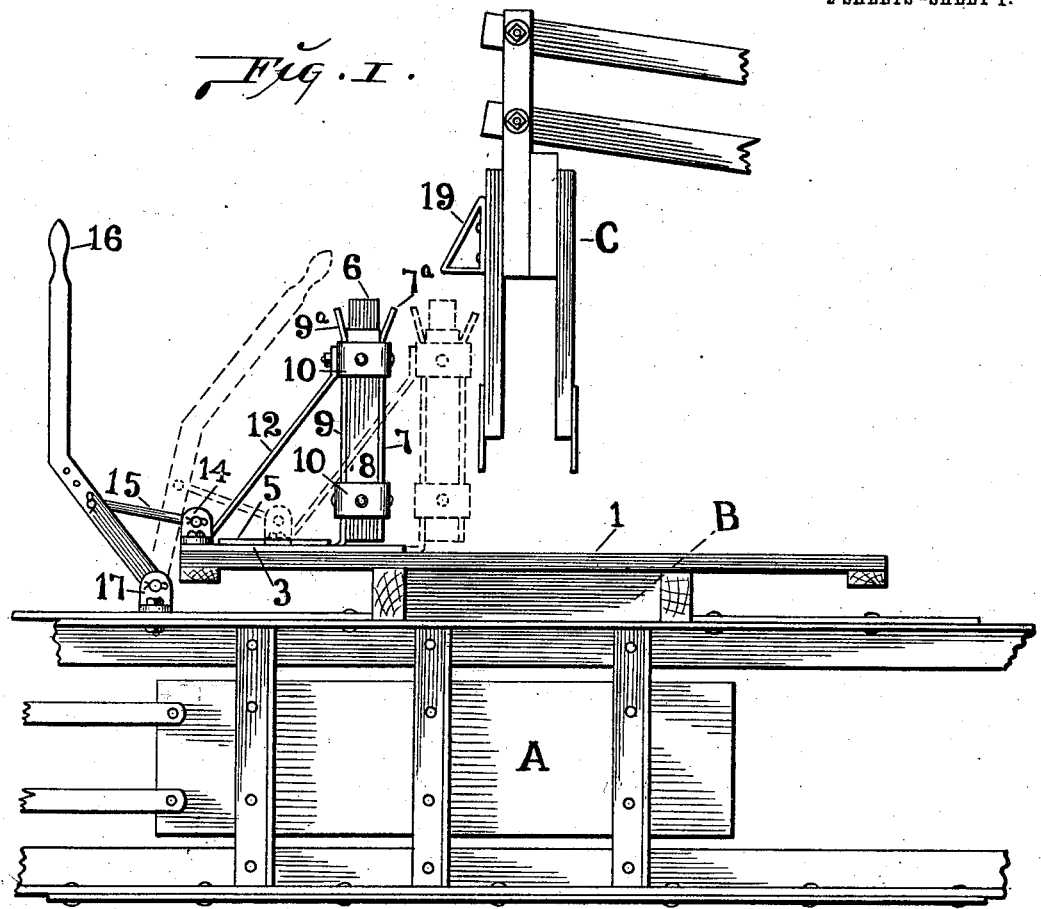
Fig. I.
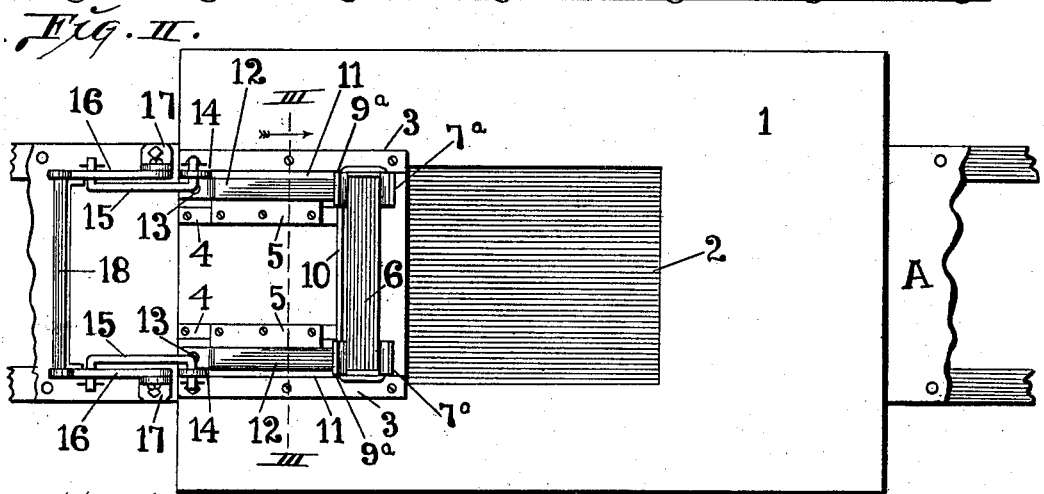
Fig. II.
Attest:
M. P. Smith
E. S. Knight
Inventor:
Luther Trabue
By Wright Bro
atty's No. 762,773. PATENTED JUNE 14, 1904.
L. TRABUE.
DIVISION BLOCK SETTER FOR BALING PRESSES.
APPLICATION FILED OCT. 29, 1903.
NO MODEL. 2 SHEETS—SHEET 2.
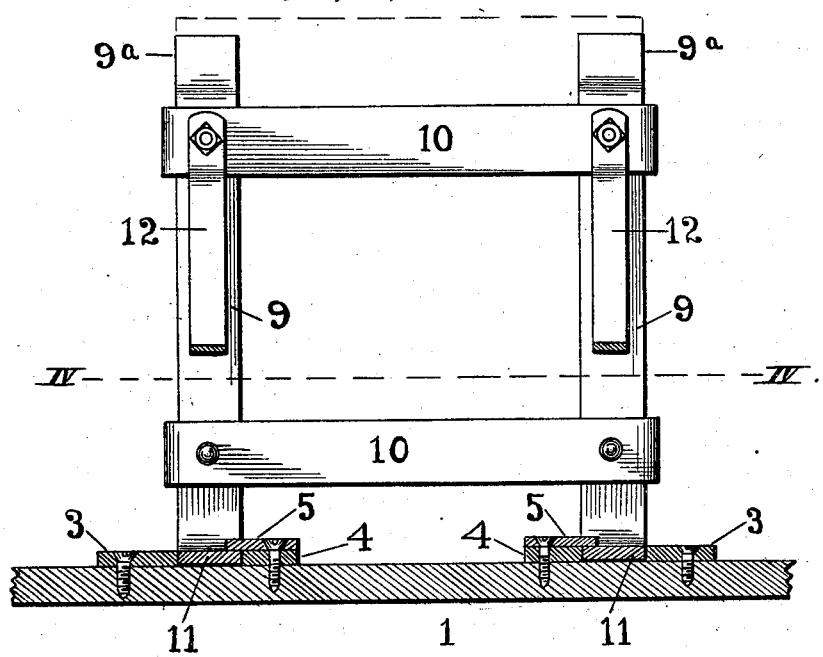
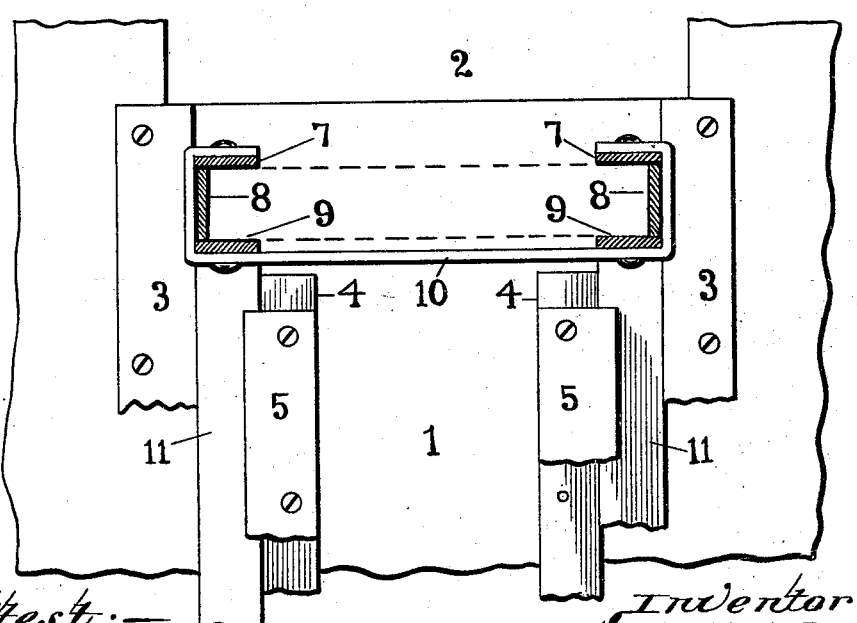
Attest:
M. P. Smith
E. S. Knight
Inventor:
Luther Trabue
By Knight Bros
Atty's No. 762,773. Patented June 14, 1904.

UNITED STATES PATENT OFFICE.

LUTHER TRABUE, OF GIRARD, ILLINOIS.

DIVISION-BLOCK SETTER FOR BALING-PRESSES.

SPECIFICATION forming part of Letters Patent No. 762,773, dated June 14, 1904.

Application filed October 29, 1903. Serial No. 178,978. (No model.)

*To all whom it may concern:*

Be it known that I, LUTHER TRABUE, a citizen of the United States, residing in Girard, in the county of Macoupin and State of Illinois, have invented certain new and useful Improvements in Division-Block Setters for Baling-Presses, of which the following is a full, clear, and exact description, reference being had to the accompanying drawings, forming part of this specification.

My invention relates to means for holding and delivering division-blocks to the baling-chambers of hay or other presses whereby said blocks are set into position in the baling-chamber immediately following the completion of a bale therein.

The invention consists in features of novelty hereinafter fully described, and pointed out in the claims.

Figure I is a side elevation of the baling-press box and feeder with my block-setter shown in connection with such parts. Fig. II is a top or plan view of the parts shown in Fig. I with the feeder omitted. Fig. III is an enlarged vertical cross-section taken on line III III, Fig. II. Fig. IV is a horizontal section taken on line IV IV, Fig. III.

A designates the press-box of a baling-press, into which the material to be baled is introduced through the feed-opening B.

C is the baling-press feeder, which may be of any common form.

1 designates a table surmounting the press-box and provided with a feed-opening 2, corresponding to the usual feed-opening B.

3 designates outer guides, and 4 inner guides, secured to the top of the table 1 and extending longitudinally thereof. Between the guides 3 and 4 is a guideway that is partially overhung by keepers 5, the utility of which will be hereinafter stated.

6 designates a division-block, which is mounted in a reciprocating frame to which travel is imparted to convey the block to a position over the feed-openings 2 and B to be dropped into the baling-chamber in the press-box. This frame consists of the following parts:

7 designates forward uprights. 8 designates end uprights, and 9 rear uprights. These uprights are all united by a pair of horizontal U-shaped bands 10, that extend continuously across the rear of the frame and the ends of which terminate in separated positions at the front of the frame, as seen in Fig. IV. The forward and rear uprights 7 and 9 have outturned upper ends $7^a$ and $9^a$, as seen in Figs. I and II, thereby providing a hopper-shape entrance for the introduction of the division-block 6, which rides downwardly into its receiving-frame to rest therein upon the table 1 when the frame is in a position retracted from the table feed-opening 2.

11 designates throw-bars connected to the rear uprights 9 of the division-block frame, the said bars being preferably continuations of said uprights. These throw-bars ride horizontally in the guideways between the guides 3 and 4 and are confined in said guideways by the keepers 5.

12 designates braces secured to the upper horizontal band 10 of the division-block frame and extending in inclined directions downwardly to the throw-bars 11, to which they are connected at 13. (See Fig. II.)

14 designates ears projecting from the throw-bars 11 at their rear ends. These ears receive the connection of the ends of links 15, the opposite ends of which are loosely mounted in hand-levers 16, pivoted to brackets 17, mounted on the press-box A. The hand-levers 16 are joined by a cross-bar 18 in order that any movement imparted to one of the levers will be communicated to the other lever.

19 designates a bracket secured to the feeder C in a position that will cause it to strike the divison-block when mounted in its frame and discharge the block from the frame in a positive manner in the event of its sticking therein when the block-frame is moved over the feed-opening leading into the press-box.

In the practical use of my block-setter the division-block frame is normally positioned, as seen in Figs. I, II, and IV, so as to be retracted from the feed-opening of the press-box. The division-block is then introduced into its frame and is ready to be dropped perpendicularly into the baling-chamber when a bale is completed and the block-frame is moved into a position above the press-box feed-opening. The division-block is preferably of a size that will fit loosely in its receiving-frame in order that the block will drop out of the frame by gravitation as soon as the frame is moved to the feed-opening. When the block is to be dropped, either one of the hand-levers 16 is grasped by the operator from either side of the baling-press, or the operator may throw the lever when standing on the table 1. The levers are thrown into the position indicated by dotted lines, Fig. I, and when so moved the division-block frame is carried in the position indicated by dotted lines, when the block in the frame will be directly over the feed-opening leading to the baling-chamber and fall into said chamber. Should the block fail to fall from the frame, it is struck by the bracket 19 on the downward movement of the feeder C next succeeding the forward throw of the division-block frame, and said bracket positively discharges the block.

I claim as my invention—

1. In a block-setter for baling-presses, the combination with the press-table having guideways therein, of a series of uprights having their upper ends bent outwardly, and a pair of said uprights having at their lower ends longitudinal projections resting loosely in said guideways to travel therein, horizontal bands securing said uprights together and means connected with said projections for reciprocating said uprights, substantially as set forth.

2. In a block-setter for baling-presses, the combination with the press-table having guideways therein, of a series of uprights having their upper ends bent outwardly, and a pair of said uprights having at their lower ends projections forming longitudinal bars resting loosely in said guideways to travel therein, a pair of horizontal bands securing said uprights together at their upper and lower ends, a pair of braces connecting said longitudinal bars to the upper horizontal bands and means connected with said longitudinal bars for reciprocating said uprights, substantially as set forth.

3. In a block-setter for baling-presses, the combination with the press-table having guideways therein, of a series of uprights having their upper ends bent outwardly, and a pair of said uprights having at their lower ends projections, forming longitudinal bars resting loosely in said guideways to travel therein, a pair of horizontal bands securing said uprights together at their upper and lower ends a pair of braces connecting said longitudinal bars to the upper horizontal bands and means for reciprocating said uprights comprising a pair of hand-levers pivoted to the press-table and a pair of links connecting the hand-levers to said longitudinal bars, substantially as set forth.

LUTHER TRABUE.

In presence of—
MERIDA WILLIAM CORDER,
J. HARRY TIETSORT.